United States Patent
Kadelka (10) Patent No.: US 11,946,745 B2
(45) Date of Patent: Apr. 2, 2024

(54) PROVIDING ADAPTED POSITIONING INFORMATION TOWARDS AT LEAST ONE CONSUMING APPLICATION REGARDING A PLURALITY OF OBJECTS

(71) Applicant: Deutsche Telekom AG, Bonn (DE)

(72) Inventor: Arndt Kadelka, Cologne (DE)

(73) Assignee: DEUTSCHE TELEKOM AG, Bonn (DE)

( * ) Notice: Subject to any disclaimer, the term of this patent is extended or adjusted under 35 U.S.C. 154(b) by 109 days.

(21) Appl. No.: 17/582,028

(22) Filed: Jan. 24, 2022

(65) Prior Publication Data
US 2022/0236061 A1 Jul. 28, 2022

(30) Foreign Application Priority Data
Jan. 26, 2021 (EP) .................................. 21153468

(51) Int. Cl.
*G01C 21/00* (2006.01)
*G06F 9/54* (2006.01)
*H04W 4/38* (2018.01)

(52) U.S. Cl.
CPC ........... *G01C 21/005* (2013.01); *G06F 9/541* (2013.01); *H04W 4/38* (2018.02); *G06F 2209/547* (2013.01)

(58) Field of Classification Search
CPC . G01C 21/005; G06F 9/541; G06F 2209/547; H04L 67/52; H04L 67/12; H04W 4/021; H04W 4/20; H04W 4/38
See application file for complete search history.

(56) References Cited

U.S. PATENT DOCUMENTS

| | | | |
|---|---|---|---|
| 8,869,095 B2 * | 10/2014 | Long | G06F 8/30 706/62 |
| 2009/0105950 A1 * | 4/2009 | Arteaga | H04W 4/20 701/469 |

(Continued)

FOREIGN PATENT DOCUMENTS

| WO | WO-2009075431 A1 * | 6/2009 | ........... G01C 21/206 |
|---|---|---|---|
| WO | WO 2016196717 A2 | 12/2016 | |

OTHER PUBLICATIONS

Bekkelien et al.; Harmonization of Position Providers; 2012 International Conference on Indoor Positioning and Indoor Navigation, 13_15th Nov. 2012 (Year: 2012).*

(Continued)

*Primary Examiner* — Michael J Zanelli
(74) *Attorney, Agent, or Firm* — LEYDIG, VOIT & MAYER, LTD.

(57) ABSTRACT

Adapted positioning information is provided towards at least one consuming application regarding a plurality of objects. In a first step, the position of at least one specific object is detected using at least one sensor of a sensor layer or functionality, thereby generating at least one piece of preliminary positioning information. In a second step, subsequent to the first step, a positioning middleware functionality generates at least one piece of adapted positioning information, based on the at least one piece of preliminary positioning information, and based on a priori knowledge. In a third step, subsequent to the second step, the at least one piece of adapted positioning information is provided to the at least one consuming application.

14 Claims, 3 Drawing Sheets

(56) References Cited

U.S. PATENT DOCUMENTS

2021/0004075 A1    1/2021  Protter et al.
2022/0201427 A1*   6/2022  Rechenberger ....... H04W 4/025

OTHER PUBLICATIONS

Peng et al.; Industrial Location-Based Services; 2010 5th IEEE Conf. on Industrial Electronics and Applications; Taichung, 2010; pp. 1815-1829 (Year: 2010).*
Rodas et al.; Architecture for Multi-Technology Real-Time Location Systems; Sensors 2013, vol. 13, pp. 2220-2253 (Year: 2013).*

* cited by examiner

PROVIDING ADAPTED POSITIONING INFORMATION TOWARDS AT LEAST ONE CONSUMING APPLICATION REGARDING A PLURALITY OF OBJECTS

CROSS-REFERENCE TO PRIOR APPLICATIONS

This application claims benefit to European Patent Application No. EP 21 153 468.0, filed on Jan. 26, 2021, which is hereby incorporated by reference herein.

FIELD

The present invention relates a method for providing adapted positioning information towards at least one consuming application regarding a plurality of objects comprising at least one specific object.

Furthermore, the present invention relates to a system or a telecommunications network for providing adapted positioning information towards at least one consuming application regarding a plurality of objects comprising at least one specific object.

Additionally, the present invention relates to a positioning information consuming application for receiving adapted positioning information regarding a plurality of objects comprising at least one specific object.

Furthermore, the present invention relates to a program and to a computer-readable medium for providing adapted positioning information towards at least one consuming application regarding a plurality of objects comprising at least one specific object.

BACKGROUND

Industry activities addressing digitalization of campus and production environments demand for positioning services in addition to connectivity. For instance, in production environments diverse requirements on positioning services needs to be fulfilled. However, localization requirements are typically different, dependent on the application: E.g. logistic processes typically require a rather coarse-grain localization of raw material, e.g. when shipped to the campus or industrial location; however, in the production line, fine-grain positioning accuracy at high update rate is required to track automatic guided vehicles (AGVs) or parts within the production process on the shop floor. While there are different positioning technologies, there is no single positioning technology able to fulfill all these diverse and different positioning requirements in a cost-efficient manner For instance, for outdoor tracking, global navigation satellite systems (e.g. GPS) are widely used, whereas indoor high precision requirements are currently served by e.g. ultra-wideband (UWB) positioning systems, requiring a rather costly infrastructure. This may be complemented by RFID-based or mobile network positioning services based on 3GPP's 4G or 5G functionality, supporting medium grained positioning accuracy at dedicated contact points or across the entire campus environment, respectively.

Hence, there is a need to feed each respective positioning information from different positioning technologies to campus industry or other applications according to their respective or dedicated requirements.

SUMMARY

In an exemplary embodiment, the present invention provides a method for providing adapted positioning information towards at least one consuming application regarding a plurality of objects comprising at least one specific object. Regarding the position of the at least one specific object within a predefined area or region, at least one piece of adapted positioning information is able to be generated and provided to the at least one consuming application using a positioning middleware functionality that connects a sensor layer or functionality to an application layer or functionality. The method comprises: in a first step, the position of the at least one specific object is detected using at least one sensor of the sensor layer or functionality, the at least one sensor using at least one sensor technology, thereby generating at least one piece of preliminary positioning information; in a second step, subsequent to the first step, the positioning middleware functionality generates the at least one piece of adapted positioning information, based on the at least one piece of preliminary positioning information, and based on a priori knowledge regarding at least one out of the following: the at least one sensor used; the at least one sensor technology used; the positioning information consuming application targeted; the at least one specific object or its current environment; or process information or use case information received from the positioning information consuming application; and in a third step, subsequent to the second step, the at least one piece of adapted positioning information is provided to the at least one consuming application.

BRIEF DESCRIPTION OF THE DRAWINGS

Subject matter of the present disclosure will be described in even greater detail below based on the exemplary figures. All features described and/or illustrated herein can be used alone or combined in different combinations. The features and advantages of various embodiments will become apparent by reading the following detailed description with reference to the attached drawings, which illustrate the following:

FIGS. 5 a) and 5 b) schematically illustrate an example of a method according to the present invention.

DETAILED DESCRIPTION

Exemplary embodiments of the present invention provide an effective and cost-effective solution for providing adapted positioning information towards at least one consuming application regarding a plurality of objects comprising at least one specific object, wherein, regarding the position of the specific object within a predefined area or region, at least one piece of adapted positioning information is able to be generated and provided to the at least one positioning information consuming application. Further exemplary embodiments of the present invention provide a system or telecommunications network for providing adapted positioning information, a positioning information consuming application for or as part of such a system, and a corresponding program and computer-readable medium.

In an exemplary embodiment, the present invention is achieved by a method for providing adapted positioning information towards at least one consuming application regarding a plurality of objects comprising at least one specific object, wherein, regarding the position of the specific object within a predefined area or region, at least one piece of adapted positioning information is able to be generated and provided to the at least one positioning information consuming application using a positioning middleware functionality that is connecting a sensor layer or functionality to an application layer or functionality, wherein the method comprises the following steps:

in a first step, the position of the specific object is detected via using at least one sensor of the sensor layer or functionality, the at least one sensor using at least one sensor technology, thereby generating at least one piece of preliminary positioning information, in a second step, subsequent to the first step, the positioning middleware functionality generates the at least one piece of adapted positioning information, based on the at least one piece of preliminary positioning information, and based on an a priori knowledge regarding at least one out of the following:
the at least one sensor used,
the sensor technology used,
the positioning information consuming application targeted, and
the specific object or its current environment,
a process information or use case information received from the positioning information consuming application in a third step, subsequent to the second step, the at least one piece of adapted positioning information is provided to the at least one positioning information consuming application.

It is thereby advantageously possible according to the present invention to provide at least one positioning information consuming application with at least one piece of adapted positioning information according to the needs and requirements of that positioning information consuming application, the positioning information being generated by the positioning middleware functionality regarding the position of a specific object within a predefined area or region.

According to the present invention, it is advantageously possible to be able to apply different complementing positioning technologies such that positioning information consuming application are provided with relevant positioning information according their dedicated requirements; hence, it is advantageously provided that the respective positioning information is fed from the different technologies (i.e. the detecting technologies providing preliminary positioning information or raw positioning information) to the campus industry applications, such as solutions for, e.g., manufacturing execution systems (MES), enterprise resource planning (ERP) and many more.

When integrating diverse positioning systems or positioning technologies, each providing dedicated (either standardized or proprietary) interfaces, for example application programming interfaces (APIs), it is typically an extreme effort to adapt or integrate such positioning systems or positioning technologies with different and heterogeneous industrial applications (or positioning information consuming applications). According to the present invention, a positioning middleware functionality is used in order to generate and provide adapted positioning information to the positioning information consuming applications. Hence, such a positioning middleware functionality provides the possibility to mediate between the diverse positioning technologies and the specific industrial applications, for example providing standardized APIs.

Conventionally middleware functionalities are known that are able to be used with positioning technologies and specific industrial applications, providing standardized APIs, or that are aiming to link the capabilities of distinct positioning technologies (such as, e.g. 3GPP-based positioning systems) with consuming applications, thereby hiding the details of the underlaying technologies when providing positioning information. However, such functionalities lack in at least two dimensions:
in case of simple tracking devices rather than optimized for single positioning mechanisms, and
missing application knowledge: In typical industrial scenarios, rather low cost trackers are used, maybe trackers of a different technology are applied for different use cases in the industry processes.

However, the basic concept of such known approaches is to forward the raw positioning information from the underlying positioning system without further processing. The positioning information consuming applications are able to request further services from such functionalities, such as geofencing, but have no influence on the quality of the provided positioning information itself. However, as the underlying positioning services typically show diverse and different levels of performance, such differences are likely to be provided unfiltered to the respective positioning information consuming industrial application. In case the underlying positioning system provides measurements with a high service performance (e.g. in case it is already optimized for use in production environments, such as UWB positioning systems), this might be sufficient, but in general, this is not true for other positioning technologies, or in case that different technologies are mixed. Hence, a functional extension of such known positioning middleware functionalities is required to adapt the information provided by the individual positioning technology to the requirements of the positioning information consuming applications.

According to the present invention, it is advantageously possible that the positioning middleware functionality generates the adapted positioning information, based on the preliminary positioning information (provided by the at least one sensor of the sensor layer or functionality), and based on an a priori knowledge regarding at least one out of the following:
the at least one sensor used,
the sensor technology used,
the positioning information consuming application targeted, and
the specific object or its current environment,
a process information or use case information received from the positioning information consuming application. Subsequently, the adapted positioning information is able to be provided to the at least one positioning information consuming application. Hence, it is advantageously possible according to the present invention that, for example, ultra-wideband-based trackers (or sensors) are applied on a shop floor for specific parts/boxes, whereas GPS or 3GPP positioning is used outdoors when locating, e.g., fork lifters carrying these parts/boxes; the relevant process information is available in the company's application environment (MES, ERP, etc.) that drives the value of the positioning information, and, for example, these process applications are able to provide the information that the UWB tracker (e.g. used for the box with "ID_uwb") belongs to the same process element when carried by the fork-lifter (with an "ID_3GPP") during delivery from outdoors to indoors; hence, two identities at the same location are linked by the process in contrast to the smartphone case where one identity provides multiple positioning capabilities.

According to the present invention, the processing of raw measurements of a positioning technology (i.e. using at least one sensor of the sensor layer or functionality) takes place at distinct steps providing further estimations for the positioning process, i.e. in order to determine the adapted positioning information. These different steps may start from the raw measurements and proceed to the final positioning coordinates (or adapted positioning information) of a tracking device or equipment (i.e. a sensor). Within each individual step a specific algorithm or processing approach is able to be applied. Typically, one or more of these steps are applied in positioning technologies (based on GPS, UWB, WiFi, 3GPP-networks, RFID systems, etc.), on the network side, on the tracker/equipment (i.e. sensor) side, or both. According to the present invention, it is preferred that the detailed process applied is specific for the individual positioning technology. In order to consume, interpret and enhance positioning information according to the needs of a positioning aware application (i.e. the positioning information consuming application), the positioning middleware (or positioning middleware functionality) is introduced—being capable to process the positioning information provided by one or more positioning technology (i.e. the preliminary positioning information) according to the needs of the (positioning information consuming) industry applications and use cases. Exemplary embodiments of the invention use an a-priori knowledge of both the requirements of the positioning information consuming applications and the performance and API characteristics of the individual positioning technology (i.e. the sensor (of the sensor layer or functionality) used). Additionally, a-priori knowledge on the tracked device (tracker, tag, etc., i.e. the specific object) can also be considered in the evaluation process of the positioning middleware (functionality). Also use case information is able to be consumed when it is expected that the positioning middleware services use case specifically, e.g. when servicing quasi-static internet-of-things (IoT) devices in contrast to highly dynamic trackers on moving objects such as automatic guided vehicles (AGVs).

According to the present invention, this a-priori information is preferably able to be provided and transferred via a positioning middleware API (to/from the positioning information consuming applications) and the individual positioning technology API (to/from the individual positioning technology, i.e. the sensor layer or functionality). One or more of the following kinds of a-priori information from the (positioning information consuming) application(s) may be taken into consideration:
device/tag identifier, (also called location provider),
periodicity: required update rate of positioning information,
single request: one-time individual positioning information,
maximum age of positioning information,
device mobility: static (as in case of sensors) or dynamic (in case of objects to be tracked),
process information, such as, e.g., collocated objects, joining the identifiers of different devices or tags to one location object (such as, e.g., a support element or pallet, such as an euro pallet having an LTE (or 4G), or a 5G positioning device or sensor, being joined with a workpiece having an ultra-wideband positioning device or sensor).

Furthermore, one or more of the following kinds of a-priori information from an individual positioning technology (or a plurality thereof) is or are taken into consideration:
positioning performance in respective environment,
request capability: single requests and or self-controlled period update of measurements,
pre-processing capabilities: e.g., averaging on a set of measurements before providing information to positioning middleware.

This information is able to be initially negotiated and later updated via the respective application programming interfaces, for example applying dedicated messages and procedures, e.g., locations_provider_requirements/characteristics, location_provider_capabilities, technology_requirements, technology_capabilities.

At least parts of the technology capabilities are available at system set-up, as the positioning middleware (functionality) needs to be configured to the individual positioning technologies. However, dynamic capability information may be exchanged during operation.

Based on this a-priori information, that may be updated during operation, applying the above-mentioned mechanisms, the positioning middleware (functionality) is capable to adapt the raw positioning data (or preliminary positioning information) received from the positioning technology (or sensor layer or functionality) in order to generate the adapted positioning information. Thereby, it is preferred that a position adaptation entity per location provider (device/tag) and positioning technology is required or present in the positioning middleware (functionality). This position adaptation entity allows to apply advanced processing of the raw positioning measurements based of the information obtained from application and positioning technology.

According to the present invention, this concept is able to be extended further, when considering multi-technology tracking; hence, in cases where tracking objects are equipped with multiple positioning technologies: for instance, an object may use GPS tracking when in wide-area outdoor delivery and support LTE positioning when entering the campus environment. In this case a positioning adaptation entity is able to combine raw positioning information from complementing positioning technology in its processes.

According to the present invention, this combined technology assessment not only allows to derive information for a single object, but also to improve the overall system: for instance, when a trackable object is applied with LTE and UWB positioning functionality, UWB measurements can be considered as ground (or basic) truth for rather coarse-gained LTE positioning applied in the same area. Applying combined measurements would allow to optimize the LTE positioning systems, since the actual 2D error for every spot in the environment can be measured dynamically. Thereby, the internal mechanisms of the positioning middleware (functionality)—e.g. layer 3 filters—is able to be tuned in order to optimize the positioning performance for single technology scenarios; in the example mentioned: LTE positioning is able to be dynamically tuned by UWB measurements.

According to the present invention, it is advantageously possible and preferred that the at least one piece of adapted positioning information is generated, by the positioning middleware functionality, via processing the at least one piece of preliminary positioning information in view of the a priori knowledge, and thereby being able to improve the estimation of the positioning information, wherein for example the at least one positioning information consuming application is able to use the at least one piece of adapted positioning information without applying further modifications and/or corrections.

It is thereby advantageously possible that the positioning information consuming application is able to directly use the adapted positioning information.

According to the present invention, it is furthermore advantageously possible and preferred that during and/or prior to the second step, the positioning middleware functionality receives or is in possession of relevant process information regarding the at least one specific object, and for example in relation to at least one further specific object, wherein the relevant process information regarding the at least one specific object is for example transmitted, by the at least one positioning information consuming application, to the positioning middleware functionality.

It is thereby advantageously possible according to the present invention that the adapted positioning information is able to be generated more precisely and/or more accurately.

According to the present invention, it is furthermore advantageously possible and preferred that the at least one sensor of the sensor layer or functionality, using at least one sensor technology, corresponds to or uses

- a cellular positioning technology, according to a radio access technology standard as used in mobile communication networks, for example according to the fourth generation long term evolution (LTE) mobile communication standard, or according to the fifth generation (5G) mobile communication standard, and/or
- an ultra-wideband positioning technology, and/or
- an radio-frequency identification (RFID) technology, and/or
- a near-field communication (NFC) technology, and/or
- a global navigation satellite system technology, for example the global positioning system, the Galileo system, and/or the glonass system, and/or
- an IEEE 802.11v, or WLAN, wireless local area network, technology and/or
- a Bluetooth Low Energy (BLE) technology,
- an optical technology such as LED/IR-based technology, light emitting diode/infra red-based technology or a laser-based positioning technology or an image- or camera-based positioning technology, or a ranging technology.

Furthermore, it is advantageously possible and preferred according to the present invention that the a priori knowledge corresponds to a knowledge of both the requirements of the at least one positioning information consuming application and the performance and/or characteristics of the at least one sensor of the sensor layer or functionality, wherein for example the a priori knowledge corresponds to a knowledge of whether the at least one specific object is either static or quasi-static, or highly dynamic, for example, on moving objects.

Thereby, it is advantageously possible to enhance the adapted positioning information based on the a-priori knowledge.

Furthermore, it is advantageously possible and preferred according to the present invention that the at least one sensor of the sensor layer or functionality interacts with the positioning middleware functionality via a positioning technology application programming interface, positioning technology API, and wherein the at least one positioning information consuming application interacts with the positioning middleware functionality via a positioning middleware application programming interface, positioning middleware API, wherein the a priori knowledge or at least part of the a priori knowledge is transmitted using the positioning technology application programming interface and/or using the positioning middleware application programming interface.

According to a further preferred embodiment of the present invention, the a priori knowledge regarding the specific object corresponds to one or a plurality out of the following:

- a device identifier or tag identifier or location provider,
- a periodicity information, corresponding either to the required update rate of positioning information, or to a single request for a one-time individual positioning information,
- the maximum allowed age of a piece of preliminary positioning information to be considered,
- a process information, for example relating to a further specific object being co-located with the specific object.

Furthermore, it is advantageously possible and preferred according to the present invention that the a priori knowledge regarding the at least one sensor used and/or the sensor technology used corresponds to one or a plurality out of the following:

- a positioning performance in a respective environment, for example the precision and/or accuracy of the preliminary positioning information,
- a request capability, for example whether single requests are required or whether self-controlled periodic pieces of preliminary positioning information are generated,
- pre-processing capabilities, for example whether an averaging operation is performed on a set of measurements prior to transmitting the preliminary positioning information to the positioning middleware functionality
- adaptive filtering capabilities, for example in case of the specific object being a dynamic object,
- simultaneous localization and mapping (SLAM).

Furthermore, it is advantageously possible and preferred according to the present invention that the a priori knowledge is initially negotiated and later updated via the positioning technology application programming interface and/or the positioning middleware application programming interface, wherein for example a priori knowledge comprises a system setup-related a priori knowledge, for example a positioning accuracy map, stored in the positioning middleware functionality.

According to a further preferred embodiment of the present invention, during the second step, the generation of the at least one piece of adapted positioning information, comprises applying at least one filter or filter mechanism, for example at least one adaptive filter of filter mechanism, for example a smoothing or averaging filter if the at least one specific object is estimated to be a static object, and a Kalman filter, or an extended Kalman filter, or a particle filter or a bayes filter, if the at least one specific object is estimated to be a dynamic object.

It is thereby advantageously possible to use different filters or filter mechanisms adapted to the respective application scenario.

According to a further preferred embodiment of the present invention, the process information relating to the further specific object being co-located with the specific object relates to a ultra-wideband positioning information to optimize the performance of another sensor technology, for example a cellular positioning technology, for example according to a radio access technology standard as used in mobile communication networks, such as according to the fourth generation LTE mobile communication standard, or according to the 5G mobile communication standard.

Furthermore, the present invention relates to a system or to a telecommunications network for providing adapted positioning information towards at least one consuming application regarding a plurality of objects comprising at least one specific object, wherein, regarding the position of the specific object within a predefined area or region, at least one piece of adapted positioning information is able to be generated and provided to the at least one positioning information consuming application using a positioning middleware functionality that is connecting a sensor layer or functionality to an application layer or functionality, wherein the system or telecommunications network is configured such that:

the position of the specific object is detected via using at least one sensor of the sensor layer or functionality, the at least one sensor using at least one sensor technology, thereby generating at least one piece of preliminary positioning information, the positioning middleware functionality generates the at least one piece of adapted positioning information, based on the at least one piece of preliminary positioning information, and based on an a priori knowledge regarding at least one out of the following:

the at least one sensor used, the sensor technology used, the positioning information consuming application targeted, and the specific object or its current environment, the at least one piece of adapted positioning information is provided to the at least one positioning information consuming application.

Furthermore, the present invention relates to a positioning information consuming application as part of a system according to the present invention.

Additionally, the present invention relates to a program comprising a computer readable program code and/or a computer-readable medium comprising instructions, which, when executed on a computer and/or on a positioning middleware functionality and/or on an application layer or functionality, or in part on a positioning middleware functionality and/or in part on an application layer or functionality, causes the computer and/or the positioning middleware functionality and/or the application layer or functionality to perform a method according to the present invention.

These and other characteristics, features and advantages of the present invention will become apparent from the following detailed description, taken in conjunction with the accompanying drawings, which illustrate, by way of example, the principles of the invention. The description is given for the sake of example only, without limiting the scope of the invention. The reference figures quoted below refer to the attached drawings.

The present invention will be described with respect to particular embodiments and with reference to certain drawings, but the invention is not limited thereto but only by the claims. The drawings described are only schematic and are non-limiting. In the drawings, the size of some of the elements may be exaggerated and not drawn on scale for illustrative purposes.

Where an indefinite or definite article is used when referring to a singular noun, e.g. "a", "an", "the", this includes a plural of that noun unless something else is specifically stated.

Furthermore, the terms first, second, third and the like in the description and in the claims are used for distinguishing between similar elements and not necessarily for describing a sequential or chronological order. It is to be understood that the terms so used are interchangeable under appropriate circumstances and that the embodiments of the invention described herein are capable of operation in other sequences than described or illustrated herein.

Figure 1:
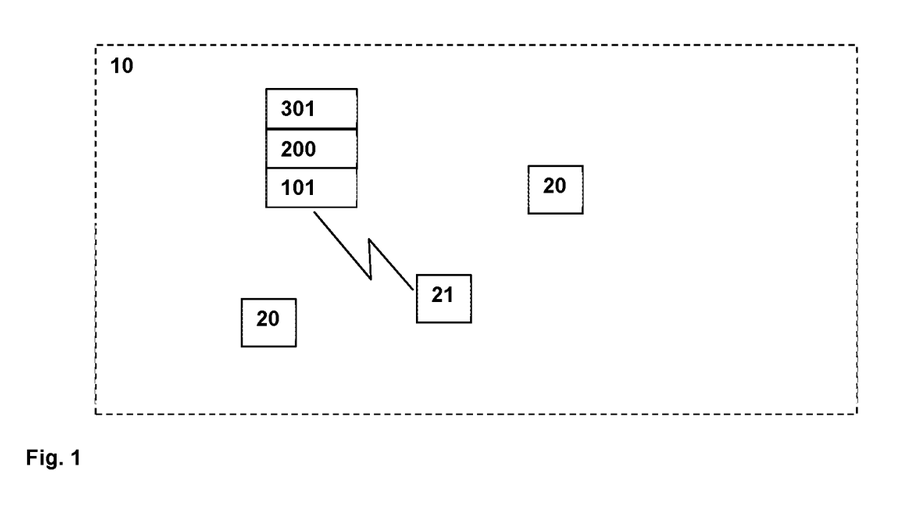
FIG. 1 schematically illustrates a predefined area or region comprising a plurality of objects, including a specific object thereof together with a system according to the present invention comprising at least one sensor, a positioning middleware functionality, and a positioning information consuming application.

In FIG. 1, a predefined area or region 10 is schematically shown (via a dotted line), the predefined area or region 10 comprising a plurality of objects 20, and a specific object 21 thereof together with an a system according to the present invention comprising at least one sensor 101, a positioning middleware functionality 200, and a positioning information consuming application 301. It is to be understood that the specific object 21 is an (arbitrary one) of the plurality of objects 20—the term specific being only used in order to designate one of the objects 20. However, the objects 20 are not necessarily all of the same type or kind; there can be different groups of objects 20, wherein the different objects 20 within one group might be of one and the same or similar type, and wherein the different objects 20 within another group might likewise be of another one of the same or similar type. Of course, it is to be distinguished between the respective object 20, 21 and its attached or otherwise assigned or associated sensor or sensor device. However, different sensors could also be assigned or associated (or attached) to one and the same object 20, 21; this could either be the case if an object actually has two (or more) attached or assigned sensors, or otherwise in case that a first object (with a first sensor) and a second object (with a second sensor) are (at least temporarily) treated as one object, e.g. in case that pallet (temporarily) carries or supports a workpiece.

Figure 2:
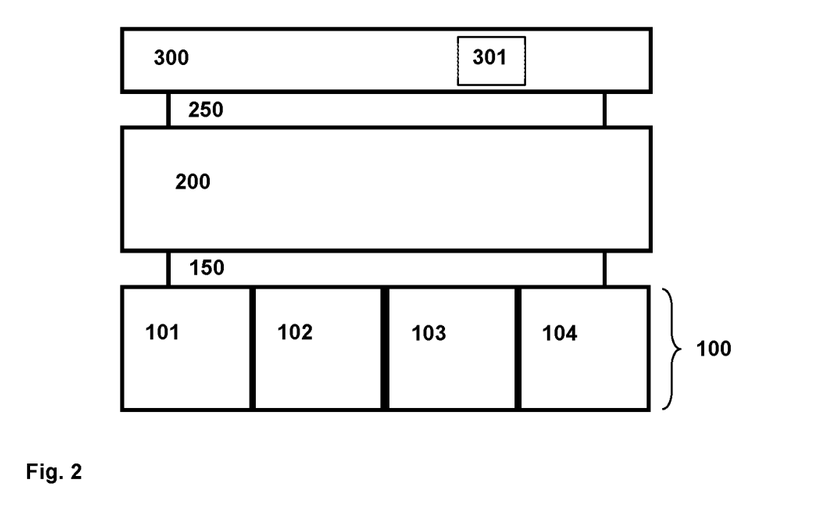
FIG. 2 schematically illustrates a system comprising a sensor layer or functionality, the positioning middleware functionality, and an application layer or functionality according to the present invention.

In FIG. 2, a system according to the present invention is schematically shown, comprising a sensor layer or functionality 100, the positioning middleware functionality 200, and an application layer or functionality 300. According to the present invention, there are typically a plurality of different sensors 101, 102, 103, 104 or different kinds of sensors (i.e. relating to different sensor technologies) and/or different sensor zones (such as a (positioning) zone A 101 (e.g. relating to a 4G/5G sensor technology), a (positioning) zone B 102 (e.g. relating to a ultra-wideband sensor technology), a (positioning) zone C 103 (e.g. relating to an RFID sensor technology), and a (positioning) zone D 104 (e.g. relating to a GPS sensor technology). Regarding the application layer or functionality 300, only one positioning information consuming application 301 is schematically shown; however, it is possible and preferred according to the present invention that the application layer or functionality 300 comprises, besides the positioning information consuming application 301, further positioning information consuming applications; however, this is not represented in FIG. 2. From FIG. 2, it can be seen that the at least one sensor 101 of the sensor layer or functionality 100 interacts with the positioning middleware functionality 200 via a positioning technology application programming interface 150. Furthermore, the at least one positioning information consuming application 301 interacts with the positioning middleware functionality 200 via a positioning middleware application programming interface 250. The a priori knowledge or at least part of the a priori knowledge is transmitted using the positioning technology application programming interface 150 and/or using the positioning middleware application programming interface 250.

Figure 3:
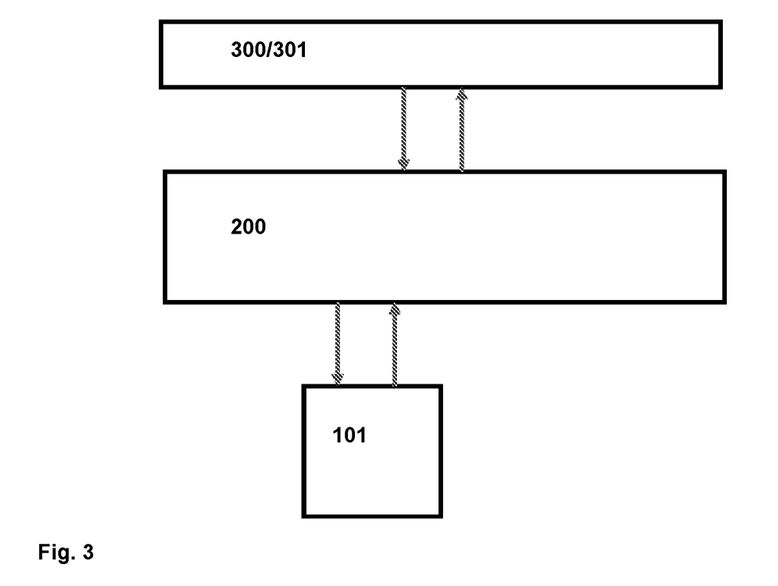
FIGS. 3 and 4 schematically illustrate the flow of information exchanged between the different layers of a system according to the present invention.
Figure 4:
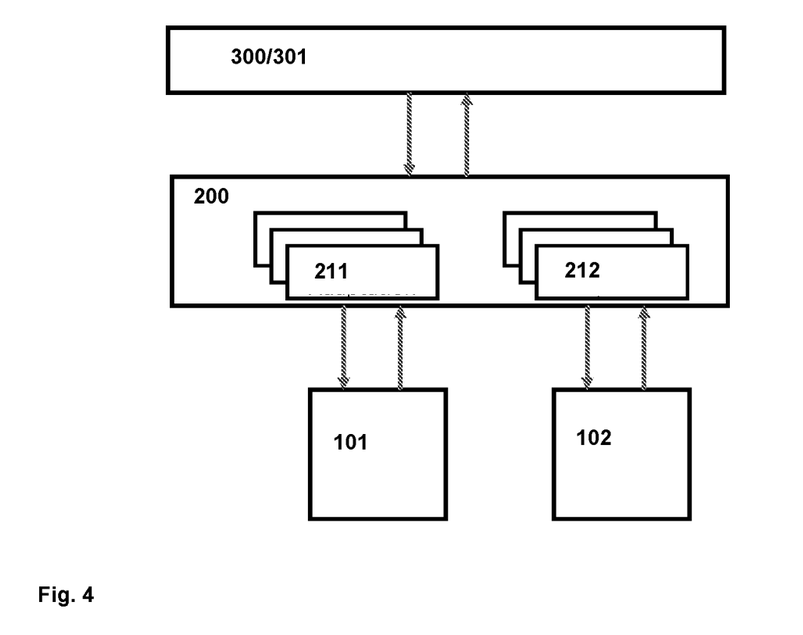

FIGS. 3 and 4 schematically illustrate the flow of information exchanged between the different layers 100, 200, 300 of a system according to the present invention; FIG. 3 represents a sensor 101 (or a sensor technology used or a kind of sensor and/or sensor or positioning zone) transmitting technology capabilities (or technology capability information or pieces of such information) towards the positioning middleware functionality 200 (i.e. the positioning middleware functionality 200 receives such technology capabilities (or technology capability information or pieces of such information)), and receiving technology requirements (or technology requirement information or pieces of such information) from the positioning middleware functionality 200 (i.e. the positioning middleware functionality 200 transmits such technology requirements (or technology requirement information or pieces of such information). Furthermore, FIG. 3 represents the positioning middleware functionality 200 transmitting location provider capabilities (or location provider capability information or pieces of such information) towards the application layer or functionality 300 or positioning information consuming application 301 (i.e. the application layer or functionality 300 or positioning information consuming application 301 receives such location provider capabilities (or location provider capability information or pieces of such information)), and receiving location provider requirements and/or location provider characteristics (or location provider requirement and/or location provider characteristic information or pieces of such information) from the application layer or functionality 300 or positioning information consuming application 301 (i.e. the application layer or functionality 300 or positioning information consuming application 301 transmits such location provider requirements and/or location provider characteristics (or location provider requirement and/or location provider characteristic information or pieces of such information)).

Likewise, FIG. 4 represents a first sensor 101 (or a first sensor technology used or a first kind of sensor and/or sensor or positioning zone) and a second sensor 102 (or a second sensor technology used or a second kind of sensor and/or sensor or positioning zone) exchanging information or data with the positioning middleware functionality 200, for example positioning adaptation elements, and the first sensor 101 exchanges information or data with a first positioning adaptation element 211, and the second sensor 102 exchanges information or data with a second positioning adaptation element 212.

Together, FIGS. 2, 3 and 4 show that the a-priori information can be provided and transferred via the positioning middleware API 250 (to/from the applications) and the individual positioning technology API 150 (to/from the individual positioning technology), see FIG. 2. This information can either be initially negotiated and later updated via the respective APIs, applying dedicated messages and procedures, cf. FIG. 4: locations_provider_requirements/characteristics, location_provider_capabilities, technology requirements, technology capabilities. Parts of the technology capabilities will be available at system set-up, as the positioning middleware functionality 200 needs to be configured to the individual positioning technologies 101, 102. However, dynamic capability information may be exchanged during operation. Based on this a-priori information, that may be updated during operation, applying mechanisms as shown in FIG. 3, the positioning middleware functionality 200 is capable to adapt the raw positioning data received from the positioning technology/technologies 101, 102. Thereby, a position adaptation entity (or element) 211, 212 per location provider (device/tag) and positioning technology is required in the positioning middleware as shown in FIG. 4. One example of a priori information could, e.g., be information available at system set-up, e.g. an information that it is known that, e.g., UWB-positioning provides less accuracy at a specific location of the predefined area or region 10; this could result in defining a geo-fence for this area (or for the residual area of the predefined area or region 10; as another example, a map regarding the accuracy of the positioning provided via LTE could be generated statically and stored in the positioning middleware functionality 200.

Figure 5:
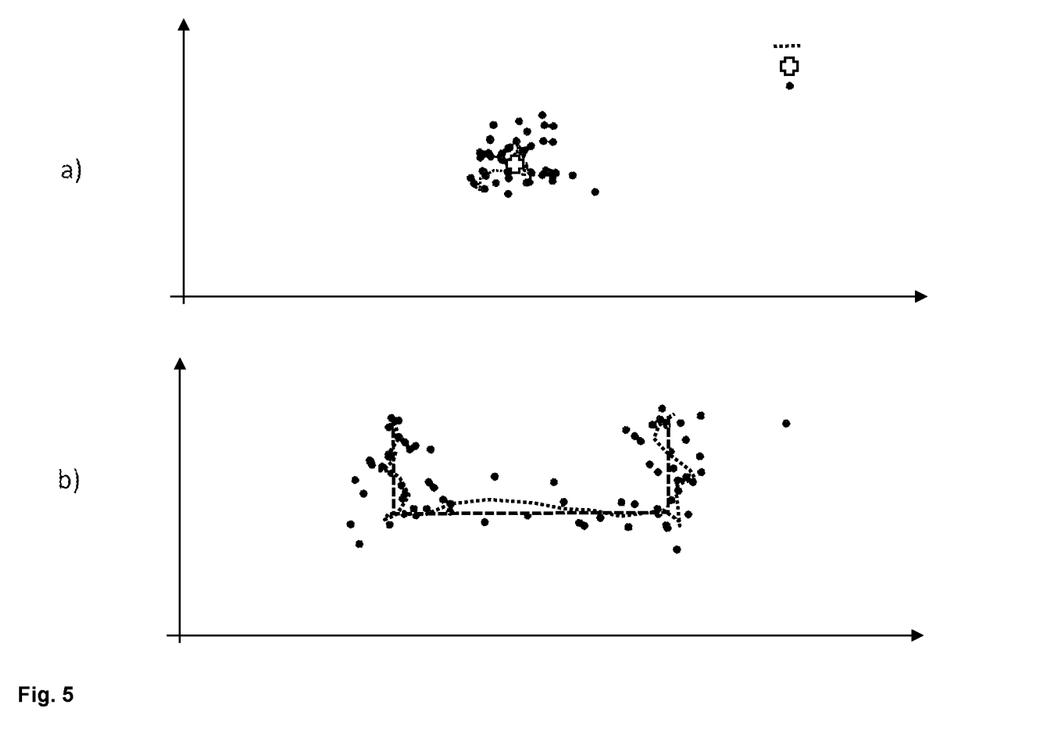

FIG. 5 schematically illustrates an example of a method according to the present invention, including the positioning measurements for UWB positioning and LTE positioning for a 55 m (abscissa in the represented system of coordinates)× 30 m (ordinate in the represented system of coordinates) production facility. FIG. 5a shows the measurements for a static UWB tag (associated to an object 20, 21), FIG. 5b for a dynamic, i.e. moving, tag or object 20, 21. Here a periodic update of the measurement is considered (for simplification: at 1 Hz). In both cases, when the UWB measurements are compared to the true positions (not shown in FIG. 5), these show almost no positioning error compared to the true positions, i.e. the average 2D-error (i.e. the accuracy) is only a few centimeters. Hence, when such measurements are fed to the consuming applications, like a visualization on a map, the visualized position represents the true positions and shows a minimum variance (i.e. at high precision). However, when the periodic measurement, resulting (also: 1 Hz periodicity) from an LTE system with less accuracy (and lower precision), are provided to the same applications a rather strong variation of these measurement observations will be seen on the user interface, shown in FIG. 5 via black dots. This may be tuned by the individual application but, according to the present invention, the general approach of providing the positioning middleware functionality 200 hides the specifics of the individual positioning technologies 100 to the consuming application 300. Hence, according to the present invention and for example in cases where the underlying sensor technologies do not provide very accurate positioning information, the locations of the objects is predicted, i.e. by applying location estimations based on, e.g., probabilistic methods such as smoothing and Bayes filters. However, there is no single method that serves well under every condition and for various applications. According to the present invention, the positioning middleware 200 is provided that is aware of the use case and application demands, so that it can provide directly the positioning information needed without the need for subsequent actions in the applications 300. This can be done, when the general application framework is known a-priori, as in production industries and their specific campus environments. This position adaptation entity allows to apply advanced processing of the raw (or preliminary) positioning measurements based of the information obtained from application and positioning technology. The results of, for example, an adaptive filter mechanism, being applied to the above-mentioned LTE scenarios, are shown in FIG. 5a for a static object (located at its true position represented by a cross) and in FIG. 5b for the mobile object (the mobile object moving along the dashed line), respectively. The estimations (represented by a dotted line in FIG. 5) indicate the positioning information after adaptive filtering, whereby the a-priori information on a static and dynamic object has been applied.

A smoothing has been applied for the static object (FIG. 5a), whereby a Kalman Filter was used in the dynamic scenario (FIG. 5b). According to the present invention, the estimations are provided at the same rate as the raw measurements (e.g. 1 Hz).

Figure 6:
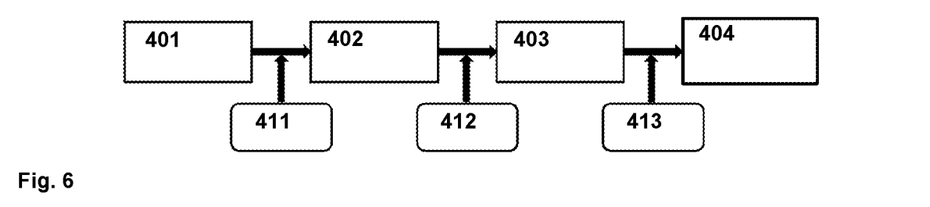
FIGS. 6 and 7 schematically illustrate further representations of a system according to the present invention.
Figure 7:
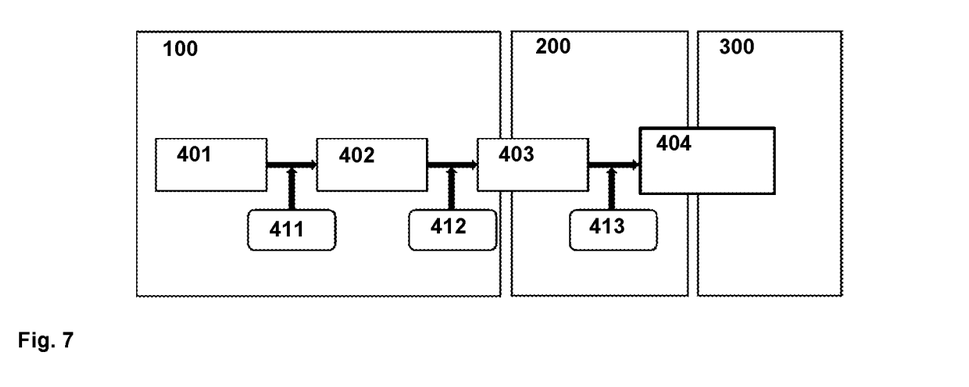

In FIGS. 6 and 7, further representations of a system according to the present invention are shown: FIG. 6 shows the processing of positioning information starting from the measurements 401 of the sensors or sensor technologies 101, 102, 103, 104, such as received signal strength indications (RSSI), time of arrival (TOA) and/or angle of arrival (AOA). From these (raw) measurements, distance pairs 402 (for example between different objects 20 or tags attached to these objects 20) are generated via a layer 1 filter 411. Furthermore, from these distance pairs 402, coordinates or coordinate information 403 is generated via a layer 2 filter 412. From these coordinates or coordinate information 403, tracker coordinates or object coordinates 404 are generated via a layer 3 filter 413. Hence, the processing of raw measurements 401 of a positioning technology takes place at distinct steps providing further estimations for the positioning process which is shown in FIG. 6, i.e. these different steps from raw measurements to the final positioning coordinates of a tracking device or equipment, i.e. the positioning coordinates of the objects 20 (or the specific object 21). Within each individual step a specific algorithm or processing approach can be applied. Typically, one or more of these steps are applied in positioning technologies (based on GPS, UWB, WiFi, 3GPP-networks, RFID systems, etc.), i.e. on or at the sensor layer or functionality 100, on the network side, i.e. on or at the positioning middleware functionality 200, or the tracker/equipment side, or both. The detailed process applied is specific for the individual positioning technology. According to the present invention, in order to consume, interpret and enhance positioning information according to the needs of a positioning aware application, the positioning middleware functionality 200 is provided. This positioning middleware is capable to process the positioning information provided by one or more positioning technologies 100 according to the needs of the positioning information consuming (industry) applications 300 and use cases. Thereby, the internal mechanisms of the positioning middleware (functionality) 200—e.g. layer 3 filters—is able to be tuned in order to optimize the positioning performance for single technology scenarios; in the example mentioned: LTE positioning is able to be dynamically tuned by UWB measurements.

While subject matter of the present disclosure has been illustrated and described in detail in the drawings and foregoing description, such illustration and description are to be considered illustrative or exemplary and not restrictive. Any statement made herein characterizing the invention is also to be considered illustrative or exemplary and not restrictive as the invention is defined by the claims. It will be understood that changes and modifications may be made, by those of ordinary skill in the art, within the scope of the following claims, which may include any combination of features from different embodiments described above.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The invention claimed is:

1. A method for providing adapted positioning information towards at least one consuming application regarding a plurality of objects comprising at least one specific object, wherein the position of the at least one specific object is within a predefined area or region, wherein at least one piece of adapted positioning information is able to be generated and provided to the at least one consuming application using a positioning middleware functionality that connects a sensor layer or functionality to an application layer or functionality, and wherein the method comprises:
  in a first step, the position of the at least one specific object is detected using at least one sensor of the sensor layer or functionality, the at least one sensor using at least one sensor technology, thereby generating at least one piece of preliminary positioning information;
  in a second step, subsequent to the first step, the positioning middleware functionality generates the at least one piece of adapted positioning information, based on the at least one piece of preliminary positioning information, and based on a priori knowledge regarding at least one out of the following:
    the at least one sensor used;
    the at least one sensor technology used;
    the positioning information consuming application targeted; the at least one specific object or its current environment; or
    process information or use case information received from the positioning information consuming application; and
  in a third step, subsequent to the second step, the at least one piece of adapted positioning information is provided to the at least one consuming application,
  wherein the at least one sensor of the sensor layer or functionality interacts with the positioning middleware functionality via a positioning technology application programming interface (API), and wherein the at least one consuming application interacts with the positioning middleware functionality via a positioning middleware application programming interface (API); and
  wherein at least part of the a priori knowledge is transmitted using the positioning technology API and/or using the positioning middleware API.

2. The method according to claim 1, wherein the at least one piece of adapted positioning information is generated, by the positioning middleware functionality, via processing the at least one piece of preliminary positioning information in view of the a priori knowledge, wherein the at least one consuming application is able to use the at least one piece of adapted positioning information without applying further modifications and/or corrections.

3. The method according to claim 1, wherein during and/or prior to the second step, the positioning middleware functionality receives or is in possession of process information regarding the at least one specific object, in relation to at least one further specific object, wherein the process information regarding the at least one specific object is transmitted, by the at least one consuming application, to the positioning middleware functionality.

4. The method according to claim 3, wherein process information relating to the at least one further specific object co-located with the at least one specific object relates to ultra-wideband positioning information to optimize the performance of another sensor technology.

5. The method according to claim 1, wherein the at least one sensor of the sensor layer or functionality, using the at least one sensor technology, corresponds to or uses
a cellular positioning technology;
an ultra-wideband positioning technology;
an radio-frequency identification (RFID) technology; a near-field communication (NFC) technology;
a global navigation satellite system technology;
a wireless local area network (WLAN) technology; a Bluetooth Low Energy (BLE) technology; and/or an optical technology.

6. The method according to claim 1, wherein the a priori knowledge corresponds to knowledge of the requirements of the at least one consuming application and the performance and/or characteristics of the at least one sensor of the sensor layer or functionality, and wherein the a priori knowledge corresponds to knowledge of whether the at least one specific object is static, quasi-static, or dynamic.

7. The method according to claim 1, wherein the a priori knowledge is initially negotiated and later updated via the positioning technology API and/or the positioning middleware API, and wherein the a priori knowledge comprises system setup-related a priori knowledge.

8. The method according to claim 1, wherein the a priori knowledge regarding the at least one specific object corresponds to one or a plurality out of the following:
a device identifier or tag identifier or location provider;
periodicity information, corresponding either to the required update rate of positioning information, or to a single request for a one-time individual positioning information;
the maximum allowed age of a piece of preliminary positioning information to be considered; or
process information relating to a further specific object co-located with the at least one specific object.

9. The method according to claim 1, wherein the a priori knowledge regarding the at least one sensor used and/or the sensor technology used corresponds to one or a plurality out of the following:
positioning performance in a respective environment; request capability;
pre-processing capabilities; adaptive filtering capabilities; or
simultaneous localization and mapping (SLAM).

10. The method according to claim 1, wherein, during the second step, the generation of the at least one piece of adapted positioning information comprises applying at least one filter or filter mechanism.

11. The method according to claim 10, wherein the at least one filter or filter mechanism is a smoothing or averaging filter based on the at least one specific object being estimated to be a static object.

12. The method according to claim 10, wherein the at least one filter or filter mechanism comprises a Kalman filter, an extended Kalman filter, a particle filter or a bayes filter based on the at least one specific object being estimated to be a dynamic object.

13. A system for providing adapted positioning information towards at least one consuming application regarding a plurality of objects comprising at least one specific object, the system comprising:
a positioning middleware functionality; a sensor layer or functionality; and
an application layer or functionality;
wherein the position of the at least one specific object is within a predefined area or region, and wherein at least one piece of adapted positioning information is able to be generated and provided to the at least one consuming application using the positioning middleware functionality that connects the sensor layer or functionality to the application layer or functionality;
wherein the sensor layer or functionality is configured to detect the position of the at least one specific object using at least one sensor of the sensor layer or functionality, the at least one sensor using at least one sensor technology, thereby generating at least one piece of preliminary positioning information;
wherein the positioning middleware functionality is configured to generate the at least one piece of adapted positioning information, based on the at least one piece of preliminary positioning information, and based on a priori knowledge regarding at least one out of the following:
the at least one sensor used;
the at least one sensor technology used;
the positioning information consuming application targeted; or the at least one specific object or its current environment; and
wherein the system is configured to provide the at least one piece of adapted positioning information to the at least one consuming application,
wherein the at least one sensor of the sensor layer or functionality interacts with the Positioning middleware functionality via a positioning technology application programming interface (API),
wherein the at least one consuming application interacts with the positioning middleware functionality via a positioning middleware application programming interface (API), and
wherein at least part of the a priori knowledge is transmitted using the positioning technology API and/or using the positioning middleware API.

14. A non-transitory, computer-readable medium having processor-executable instructions stored thereon for providing adapted positioning information towards at least one consuming application regarding a plurality of objects comprising at least one specific object, wherein the position of the at least one specific object is within a predefined area or region, wherein at least one piece of adapted positioning information is able to be generated and provided to the at least one consuming application using a positioning middleware functionality that connects a sensor layer or functionality to an application layer or functionality, and wherein the processor-executable instructions, when executed, facilitate:
in a first step, the position of the at least one specific object is detected using at least one sensor of the sensor layer or functionality, the at least one sensor using at least one sensor technology, thereby generating at least one piece of preliminary positioning information;
in a second step, subsequent to the first step, the positioning middleware functionality generates the at least one piece of adapted positioning information, based on the at least one piece of preliminary positioning information, and based on a priori knowledge regarding at least one out of the following:
the at least one sensor used;
the at least one sensor technology used;
the positioning information consuming application targeted; the at least one specific object or its current environment; or
process information or use case information received from the positioning information consuming application; and
in a third step, subsequent to the second step, the at least one piece of adapted positioning information is provided to the at least one consuming application,
wherein the at least one sensor of the sensor layer or functionality interacts with the positioning middleware functionality via a positioning technology application programming interface (API),
wherein the at least one consuming application interacts with the positioning middleware functionality via a positioning middleware application programming interface (API), and
wherein at least part of the a priori knowledge is transmitted using the positioning technology API and/or using the positioning middleware API.

* * * * *